United States Patent [19]
Schanel

[11] Patent Number: 5,742,750
[45] Date of Patent: Apr. 21, 1998

[54] SYSTEM AND METHOD FOR AUTOMATICALLY INSERTING AND DELETING AN OBJECT IN A GRAPHICS CHART

[75] Inventor: Scott J. Schanel, San Francisco, Calif.

[73] Assignee: Micrografx, Inc., Richardson, Tex.

[21] Appl. No.: 600,881

[22] Filed: Feb. 13, 1996

[51] Int. Cl.⁶ .................................................. G06F 15/00
[52] U.S. Cl. .......................................................... 395/141
[58] Field of Search ................................. 395/141, 121, 395/134; 345/117, 118

[56] References Cited

U.S. PATENT DOCUMENTS

| | | | |
|---|---|---|---|
| 4,797,836 | 1/1989 | Witek et al. | 364/518 |
| 4,937,761 | 6/1990 | Hassett | 364/518 |
| 5,200,740 | 4/1993 | Paxton et al. | 340/735 |
| 5,214,755 | 5/1993 | Mason | 395/147 |
| 5,249,137 | 9/1993 | Wilson et al. | 364/496 |
| 5,291,587 | 3/1994 | Kodosky et al. | 395/500 |
| 5,317,681 | 5/1994 | Glassner | 395/141 |
| 5,333,243 | 7/1994 | Best et al. | 395/109 |
| 5,337,404 | 8/1994 | Baudelaire et al. | 395/141 |
| 5,361,333 | 11/1994 | Ahlquist, Jr. et al. | 395/142 |
| 5,367,626 | 11/1994 | Morioka et al. | 395/159 |
| 5,396,590 | 3/1995 | Kreegar | 395/159 |
| 5,416,890 | 5/1995 | Beretta | 395/131 |
| 5,581,796 | 12/1996 | Koga et al. | 395/133 |

OTHER PUBLICATIONS

Brochure, Fleet & Partners, Inc. "BenchMarker™ Plus Version 2.5" 1993.

*Primary Examiner*—Phu K. Nguyen
*Attorney, Agent, or Firm*—Baker & Botts, L.L.P.

[57] ABSTRACT

A method for inserting an object into (77) and deleting an object from (100) a computer-generated graphics chart (26 or 58) is provided. The method includes responding to a command indicating a new object (40) is to be inserted into the chart (26) by determining whether the new object (40) is pierced by a line (32) in the chart (26). If the new object (40) is pierced by a line (32) in the chart (26) then the line (32) piercing the object (40) is redefined to be two lines, including a line entering (32) the new object (40) and a line exiting (54) the new object. The two lines are appropriately routed to source and destination points of the original line so that the two lines maintain the flow of the chart (26). The method also responds to a command indicating an object (64) is to be deleted from the chart (58) by determining whether the deleted object (64) has a first line (66) entering it and a second line (72) exiting it. The method includes removing the deleted shape (64) from the chart (58), and routing one of the first line (66) and second line (72) from the original source point (68) of the first line (66) to the original destination point (76) of the second line (72) while maintaining the flow of the chart (58).

20 Claims, 4 Drawing Sheets

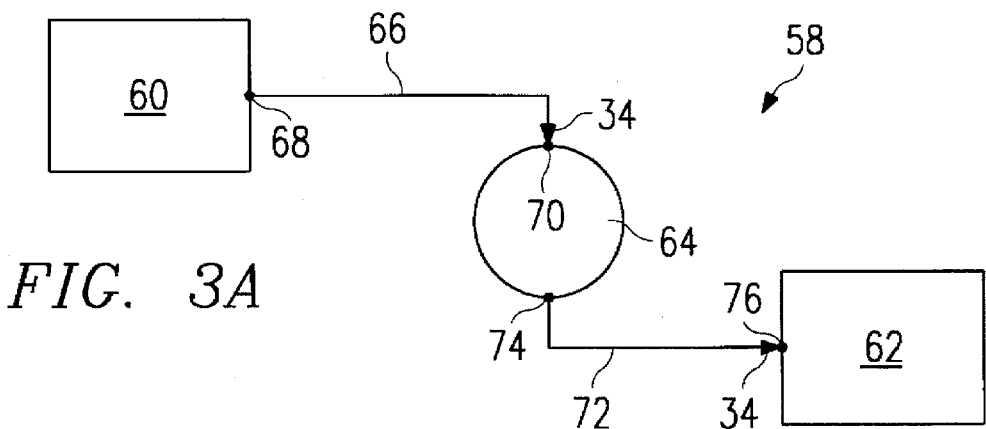
FIG. 3A
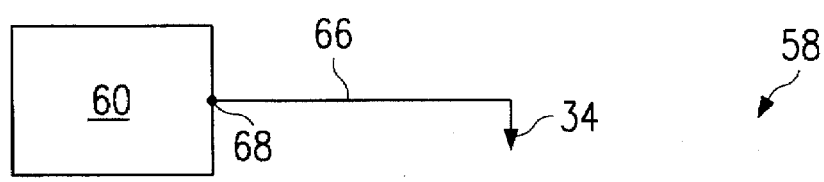
FIG. 3B
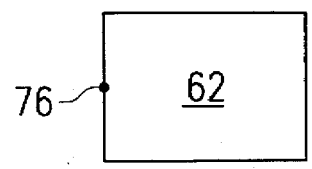
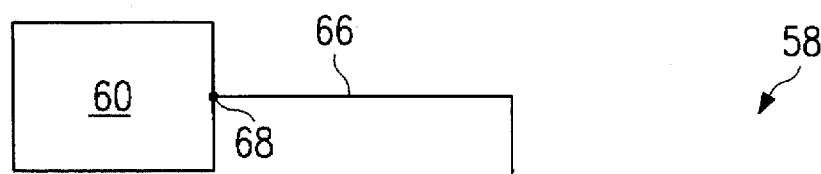
FIG. 3C
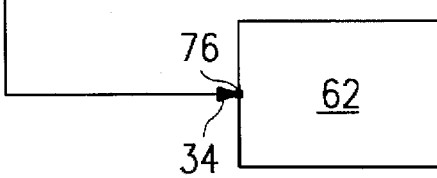

SYSTEM AND METHOD FOR AUTOMATICALLY INSERTING AND DELETING AN OBJECT IN A GRAPHICS CHART

TECHNICAL FIELD OF THE INVENTION

This invention relates in general to the field of graphics computer programs, and more particularly to a system and method for automatically inserting and deleting an object in a computer-generated graphics chart.

BACKGROUND OF THE INVENTION

Graphics are the easiest way to communicate information. The creation of graphic layouts or charts has progressed from manual pen and paper generation techniques to computer-aided techniques. Previously developed computer graphics programs or applications generally provide clean, professional graphics in a fraction of the time required for handwritten graphics. Unfortunately, these computer programs can be complicated and may require high-end computer systems in order to run the software program.

Some previously-developed computer graphics systems provide for placing a line in a chart, and also for drawing a line between objects in a chart. For example, a particular type of graphics chart known as a flow chart typically includes a number of objects representing decisions or steps within a given process. The relationship of these steps is typically represented by lines that connect the objects with one another. Additionally, several steps represented by objects will be shown in their relationship with one another in the chart. Using lines to represent the relationship of objects in a chart is not, however, limited to flow charts.

Editing a graphics chart containing objects connected by lines may require adding or deleting objects from the chart. In prior computer graphics systems, in order to add an object between two existing objects connected by a line, it is necessary to place the new object between the existing objects, delete the existing line, and then draw two lines, one traveling from the first object to the new object, and a second traveling from the new object to the second object.

Alternatively, when deleting an object from a graphics chart that is coupled to two other objects by a first line and a second line, when the object is removed from the chart two disconnected objects and lines remain. In order to connect the remaining objects with one another, both existing lines must be deleted and a new line between the objects must be drawn. This makes the task of adding and deleting objects in a computer-generated graphics chart mundane, troublesome, and sometimes difficult.

SUMMARY OF THE INVENTION

In accordance with the present invention, a user-friendly graphics system and method are provided that substantially eliminate or reduce the disadvantages and problems associated with previously-developed graphics systems and methods.

One aspect of the present invention provides a method for inserting an object into a computer-generated graphics chart. The method includes the step of maintaining a location for each object and line in the graphics chart. The method also includes responding to a command indicating a new object is to be inserted into the chart by determining whether the new object is pierced by a line in the chart. Each line piercing the new object has an original source point and an original destination point. The method further includes redefining the line piercing the new object into two lines, including a line entering the new object and a line exiting the new object. The method also includes defining a destination point for the line entering the new object to a destination point on the new object and defining a source point for the line exiting the new object to a source point on the new object. The present method also includes routing the line entering the new object from the original source point to the destination point on the new object, and routing the line exiting the new object from the source point on the new object to the original destination point. The two lines thereby maintain the original flow of the chart.

Another aspect of the present invention provides a method for deleting an object from a computer-generated graphics chart. The method includes maintaining a location for each object and line in the graphics chart. The method also includes responding to a command indicating an object is to be deleted from the chart by determining whether the deleted object has a first line entering it and a second line exiting it. The lines entering and exiting the deleted object each have an original source point and an original destination point. The method further includes removing the deleted shape from the chart and routing one of the first line and second line from the original source point of the first line to the original destination point of the second line.

Yet another aspect of the present invention provides a method for inserting an object into and deleting an object from a computer-generated graphics chart.

An additional aspect of the present invention provides a computer graphics program for inserting an object into and deleting and object from a computer-generated graphics chart.

The present graphics system and method provides numerous technical advantages. One technical advantage of the prevent invention is that it provides a computer-graphics system that automatically adds an object to a graphics chart between two objects connected by a joining line. The present system automatically generates two new lines to indicate the placement of the new object between the existing objects while maintaining the flow of the chart.

Another technical advantage of the present invention is that it provides a computer graphic's system and method that automatically redraws a line when an object is removed from between two objects that are joined by two separate lines. This allows the present system to more efficiently and quickly make changes in a graphics chart when an object is removed while maintaining the flow of the chart.

Yet another technical advantage of the present invention is that it provides a method for automatically adding and deleting objects from a computer-generated graphics chart quickly so that graphics may be edited in a fraction of the time required for "manual" editing.

An additional technical advantage of the present invention is that it provides a user-friendly system and method for automatically adding and deleting objects from a computer-generated graphics chart.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 3A through 3C provide an example of deleting an object from a graphics chart;

DETAILED DESCRIPTION OF THE INVENTION

Preferred embodiments of the present invention are illustrated in the FIGURES, like numerals being used to refer to like and corresponding parts of the various drawings.

Figure 1:
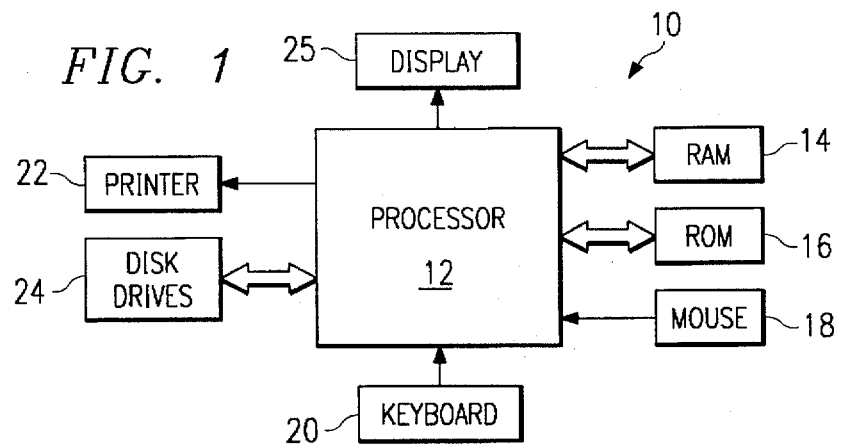
FIG. 1 illustrates a schematic block diagram for a computer system that may be employed in practice of the present invention.

FIG. 1 illustrates computer system 10 for implementing the present invention. Computer system 10 is adapted to execute any of the well-known MS-DOS, PC-DOS, OS2, Mac-OS, or Windows™ operating systems. Computer system 10 includes processor 12, random access memory (RAM) 14, read-only memory (ROM) 16, mouse 18, keyboard 20, and output devices, such as printer 22, disc drives 24, and display 25. The present invention provides a software computer program that may be stored in RAM 14, ROM 16, or disc drives 24, that is executed by processor 12. The present invention is adapted for implementation in a computer language such as, for example, C or C++, that may be compiled based on the instructions of the desired computer operating system.

The embodiments described above for computer system 10 are provided byway of an example only. Those skilled in the art will appreciate that the implementation of the present invention is not limited to the configuration described.

Operation of the present invention is described hereinafter, and where appropriate in connection with flow charts. Those of ordinary skill in the art can readily convert the concepts described and represented by the flow charts into computer implemented instructions executable by a processor for implementing the present invention.

Figure 2A:
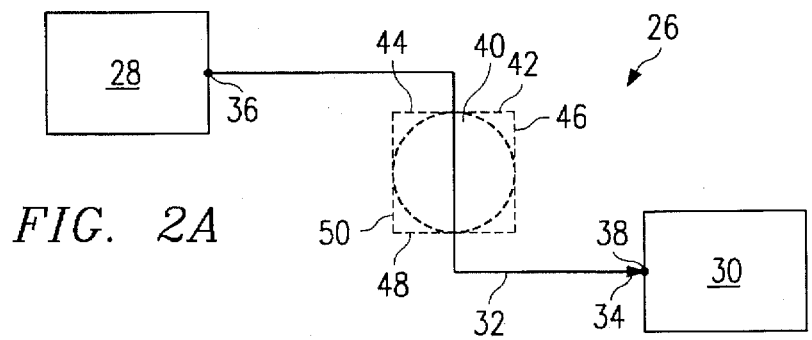
FIG. 2A through 2C show the placement of a new object in an existing graphics chart.
Figure 2B:
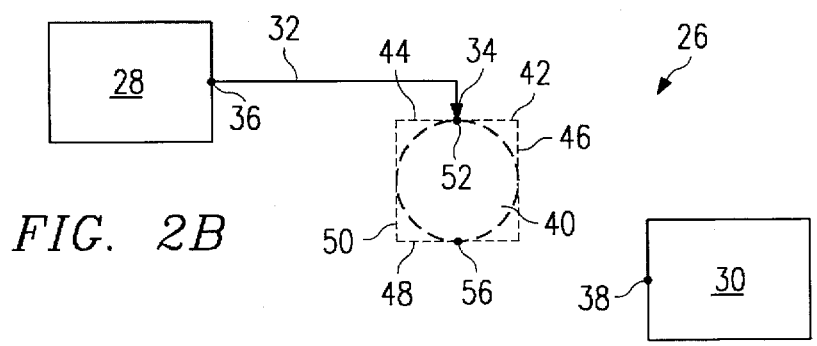
Figure 2C:
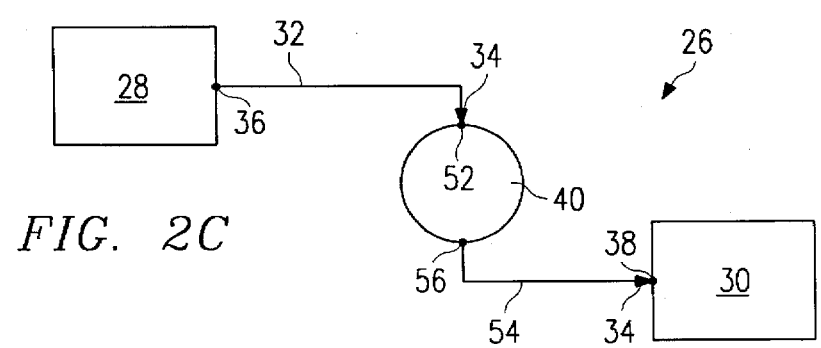

FIG. 2A through 2C illustrate the placement of a new object in an existing graphics chart. FIG. 2A shows chart 26 having source object 28 and destination object 30, coupled by line 32, which includes arrow 34 at destination object 30. Using the convention that arrow 34 of line 30 is at the end of line 32, point 36 on object 28 would be the "source" of line 32, and point 38 on object 30 is the "destination" of line 32. Objects 28 and 30 in FIG. 2A are shown as rectangles, it being understood that the present invention is not limited to only these shapes. Additionally, line 32 is shown with three segments, it being understood that the present invention is not limited to lines having this number of segments.

Chart 26 in FIG. 2A also includes new or intermediate shape 40 that is a circle. New shape 40 is shown bound by bounding box 42, with both new shape 40 and bounding box 42 shown in dash-line format to illustrate that they represent the new shape to be placed on chart 26. Bounding box 42 has four sides, including north side 44, south side 46, east side 48, and west side 50. Bounding box 42 for object 40 is used in generating new lines in chart 26 as will be described hereinafter.

As is illustrated in FIG. 2A, new object 40 has been chosen for placement between objects 28 and 30 along and on line 32. This is accomplished using standard graphical user interface (GUI) techniques. Once the user of the present method and system indicates, using for example mouse 18 and display 26 of computer system 10, the placement of new shape 40 on chart 26, then the present method and system will accomplish the redrawing of line 32 into two appropriate lines.

FIG. 2B illustrates the next step in generating new connecting lines between source object 28 and new object 30. Line 32 is redrawn to interface with object 40 at the closest connect point to the center of the entering face of bounding box 44. In the example shown in FIGS. 2A through 2C, the entering face for bounding box 42 is north side 44. Therefore, point 52, which is the center of north side 44, is the destination of line 32 between objects 28 and 40. Line 32 is redrawn from source point 36 to new destination point 52.

In order to draw a line from object 40 to object 30, the center of the exit side of bounding box 42 for object 40 is identified. This is south side 46 and its centerpoint is point 56 as shown in FIG. 2B.

Proceeding to FIG. 2C, new second line 54 is drawn from object 40 to destination point 38 on object 30. Line 54 is drawn from point 56 on the exit side of bounding box 42 to destination point 38 on object 30. The redrawing of line 32 and drawing of line 54 is done using all of the original attributes of line 32, e.g., color, arrowhead, and route style.

By this way, when new object 40 is placed on line 32 in chart 26 connecting object 28 to object 30, line 32 is redrawn between object 28 and new object 40. Additionally, new line 54 is drawn from new object 40 to object 30 while maintaining the flow in chart 26. This also results in the automatic generation of two lines to accommodate the placement of new object 40 between objects 28 and 30 while maintaining the flow in chart 26. This also eliminates the need in prior art systems to completely delete line 32 and to generate two separate lines; one from object 28 to object 40 and one from object 40 to object 30.

FIGS. 3A through 3C illustrate deleting an object from a chart and redrawing the lines in the chart. FIG. 3A shows chart 58, including source object 60, destination object 62, and intermediate object 64 between source object 60 and destination object 62. Line 66 runs between source object 60 and intermediate object 64. The source of line 66 is point 68 on object 60, while the destination for line 66 is point 70 on intermediate object 64. Line 72 travels between intermediate object 64 and destination object 62. The source of line 72 is point 74 on intermediate object 64, and the destination of line 72 is point 76 on destination object 62. It is noted that the present invention is not limited to the objects or line attributes shown in FIG. 3A, but also applies to many other object forms and line attributes.

FIG. 3B shows the results of when intermediate object 64 is deleted from chart 58, leaving source object 60, destination object 62, line 66, and line 72 (not shown in FIG. 3B). In accordance with the present invention, once the intermediate object is deleted, one of the lines from the intermediate object to either the source object or destination object is deleted. The source and destination points for the deleted line are saved for redrawing the remaining line. In the example shown in FIG. 3B, line 72 has been deleted but destination point 76 for line 72 is saved for redrawing line 66.

FIG. 3C shows the extension of line 66 from source object 60 to destination object 62 in response to intermediate object 64 being deleted from chart 58. Line 66 is re-routed to destination point 76 of line 72. By this way, when intermediate object 64 is deleted from chart 58, line 66 is redrawn to connect source object 60 to destination object 62.

Alternatively, if line 66 has been deleted along with intermediate object 64, then line 72 is redrawn using source point 68 as the source point for redrawing line 72 up to source object 60. By either of these methods, a single line between source object 60 and destination object 62 results once intermediate object 64 is deleted from chart 58 while maintaining the flow in chart 58.

Figure 4:
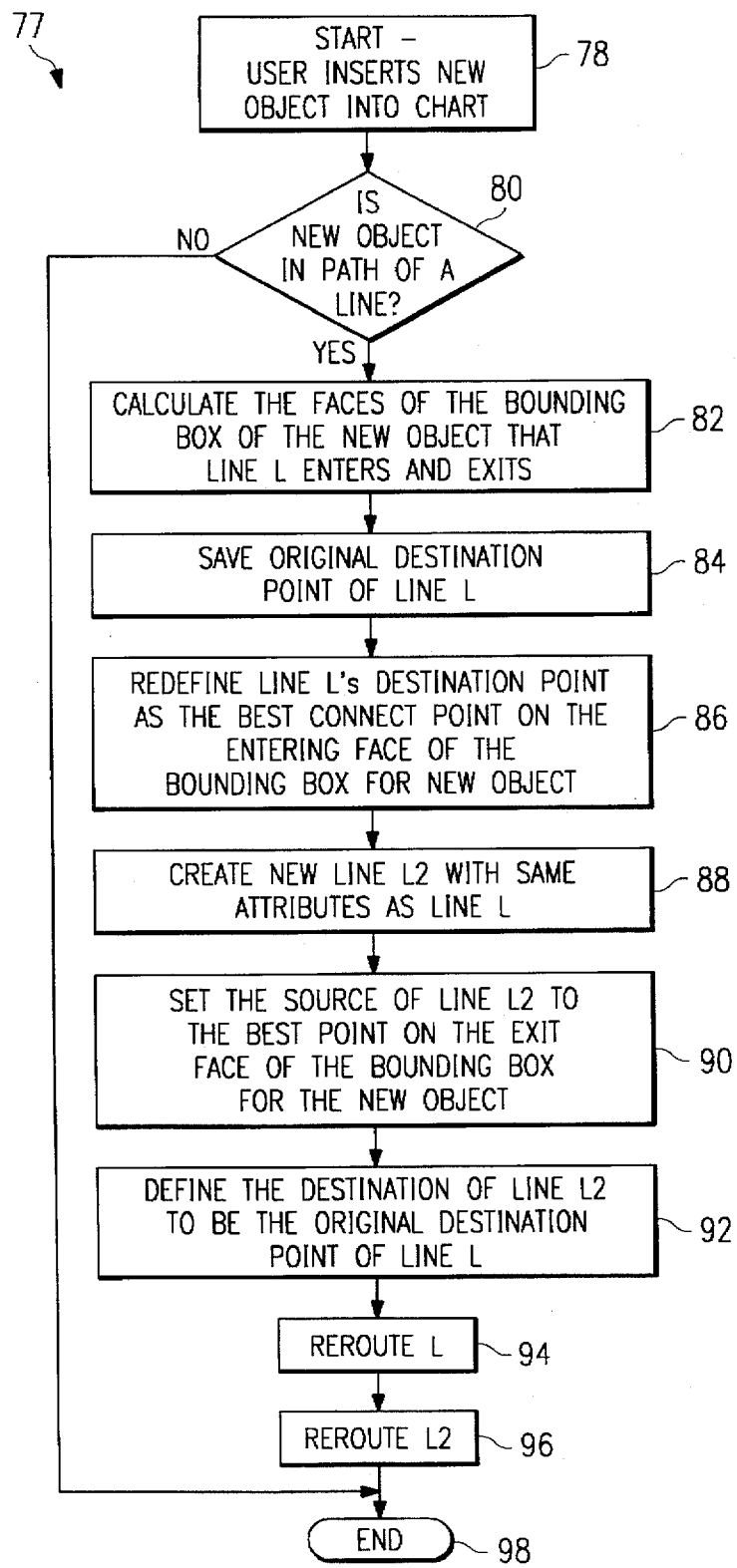
FIG. 4 illustrates an exemplary flow chart for responding to the placement of a new object in a chart in accordance with the present invention.

FIG. 4 shows an exemplary flow chart of insert new object function 77 and the steps executed by processor 12 in response to a user of the present system manipulating mouse 18 or keyboard 20 in such a way as to place a new object on a graphics chart. FIG. 4 will be described with respect to the example provided in FIGS. 2A through 2C with placement of new object 40 in chart 26. The process begins at step 78 when the user places new object 40 on chart 26. As previously noted, chart 26 includes line 32 between source object 28 and destination object 34. Line 32 has source point 36 and destination point 38. The location of each object and line on chart 26, as well as the attributes of the data, is maintained by processor 12 of computer system 10. Additionally, new object 40 includes a set of data maintained by processor 12 that represents its position on chart 26 with respect to the other lines and objects on chart 26.

At step 80, a query is made as to whether the new object is in the path of any lines on the chart. This is accomplished by processor 12 comparing the data for the new object with the data for the existing objects and lines in the chart. Referring to the example of FIG. 2A, this involves determining whether the lines in chart 26, e.g. line 32, crosses bounding box 42 of new object 40. If the answer at step 80 is no, then the new object has not been placed on an existing line and no changes to the existing lines in the chart are required. When this occurs at step 80 the insert new object function 77 may be exited. If, however, the answer to the query at step 80 is that the new object is in the path of a line, that line is identified (line L) and the flow proceeds to step 82.

At step 82 the faces or sides of the bounding box for the new object that line L enters and exits are identified. In FIG. 3A, this corresponds to identifying that line 32 enters north side 44 and exits south side 46 of bounding box 42 of new object 40. Next, at step 84, the current destination point of line L is saved. In the example of FIGS. 3A through 3C, this corresponds to saving destination point 38 of line 32. Next, at step 86 the destination point of line L is redefined to be the best connect point on the entering face of the bounding box the new object. In the example of FIG. 2B, the destination point of line 32 is redefined to be point 52 in the center of north side 44 of bounding box 42 for new object 40. Line 32 now has a source and destination point between object 28 and object 40.

Proceeding to step 88, a new line (line L2), or line 54 in the example of FIG. 2C, is created having the same attributes as line L. At step 90, the source of line L2 is defined to be the best point or center of the exit face of the bounding box for the new object. In the example of FIGS. 2A through 2C this corresponds to setting the source of line 54 to be point 56 on south side 46 on bounding box 42 for new object 40.

Proceeding to step 92, the destination point for new line L2 is defined to be the original destination point of line L. In the example of FIG. 2C, this corresponds to defining the destination point of line 54 to be point 38 on object 30.

At steps 94 and 96, line L and line L2, respectively, are rerouted using standard computer instructions for drawing a line on a graphics terminal or printer. Once this is completed, function 77 ends at step 98 and a new object has been automatically placed on a line connecting two existing objects. Those skilled in the art will recognize that the steps of insert new object function 77 may be implemented using standard programming techniques into a set of computer implemented instructions executable by a processor.

Figure 5:
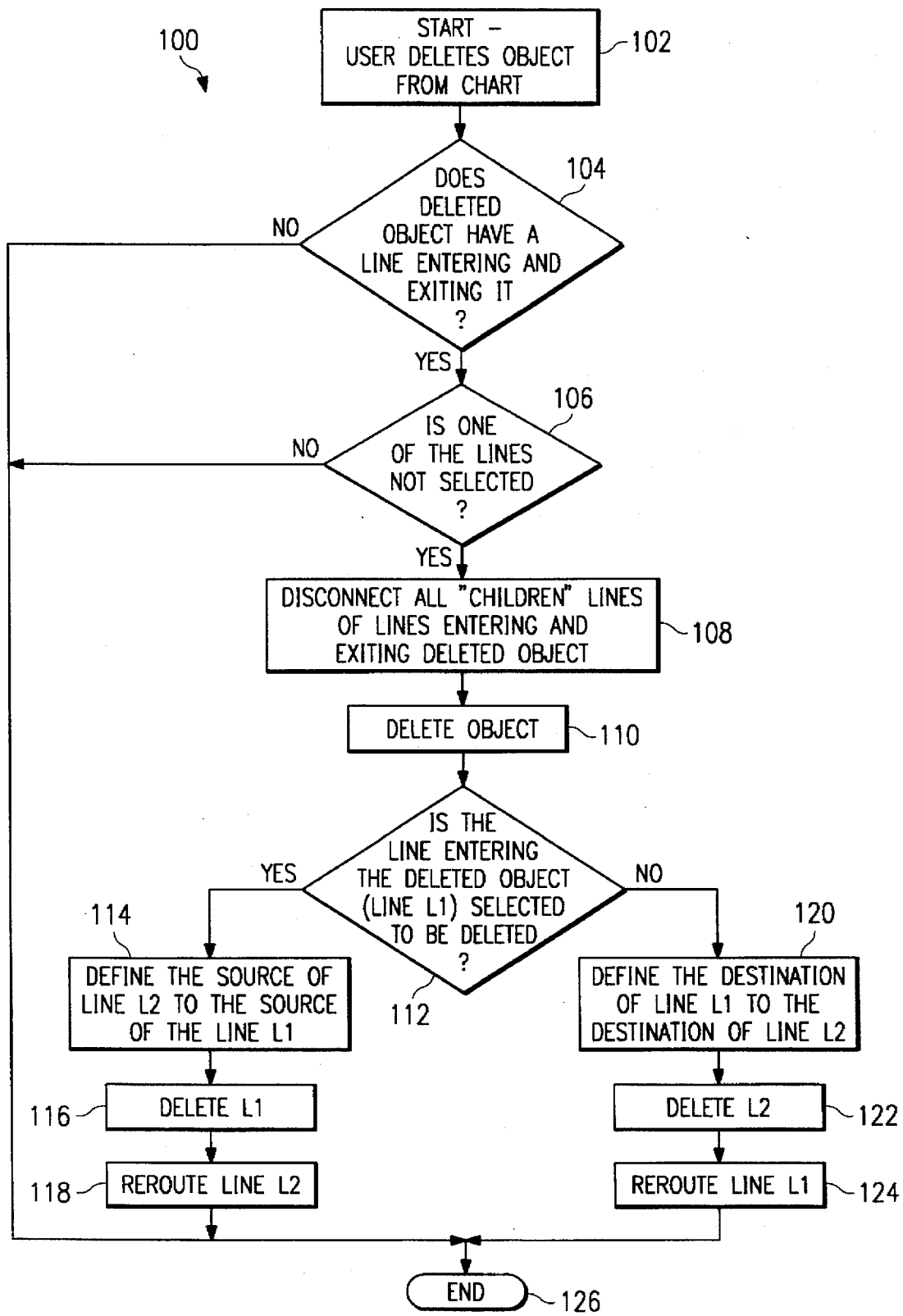
FIG. 5 provides an exemplary flow chart for the removal of an object from a chart in accordance with the present invention.

FIG. 5 illustrates delete object function 100 providing an example of the steps executed by processor 12 in responding to user inputs to delete an object from a chart. This corresponds to the example above in FIGS. 3A through 3C when intermediate object 64 was deleted from chart 58 and line 66 was redrawn to interconnect between objects 60 and 62.

Function 100 begins at step 102 in response to a user instructing processor 12 to delete a selected object from a chart. Next, at step 104, a query is made as to whether the object to be deleted has a line entering and exiting it. If the answer at step 104 is no, then the flow proceeds to the end of function 100. If, however, the answer to step 104 is yes, then the flow proceeds to step 106 where a second query is made as to whether one of the lines entering or exiting the deleted object is not selected. If all lines entering and exiting the deleted object are selected, then these lines will also be deleted along with the object and no rerouting of lines in the chart is required. If the answer at step 106 is no the flow proceeds to the end of function 100.

At step 108, all of the lines extending from the lines entering and exiting the deleted object are disconnected from these lines. Lines connecting to the lines entering and exiting the deleted object are sometimes referred to as "children" lines of these lines. In the example of FIGS. 3A–3C, line 66 will be referred to as line L1, while line 72 will be referred to as line L2. Neither of these lines have any "children" lines so step 108 provides no change to these lines.

At Step 110, the deleted object is removed from the chart. This corresponds to object 64 in Chart 58 of FIGS. 3A through 3C being removed.

At Step 112, a query is made as to whether Line L1 was also selected to be deleted. If Line L1 was also selected to be deleted, then the flow proceeds to step 114 where the source of Line L2 is defined to the source of Line L1. At step 116 line L1 is deleted. In the example of FIG. 3A, line 66 is deleted at step 116. At step 118 line L2 is rerouted using its new source point from step 114 and its current destination point. In FIGS. 3A through 3C this corresponds to rerouting line 72 from source point 68 to destination point 76 thereby completing the new line.

Returning to the query at step 112, if line L1 is not selected, e.g., line 66 in FIG. 3A is not deleted, then the flow proceeds to step 120 where the destination of point line L1 is defined to be the destination of point of line L2. This corresponds to setting the destination point of line 66 to destination point 76. Line L2 is then deleted at Step 122, and at step 124 line L1 is rerouted from its original source point to the new destination point defined at step 120. This corresponds to routing line 66 from point 68 to point 76 in FIG. 3C. Delete object function 100 then ends at step 126.

Using the steps described for delete object function 100 in FIG. 5, when an object is removed from a chart, the lines connecting to that object are redrawn so that the void created by the deleted object is filled in. All attributes of the new line are taken from the existing line. Those skilled in the art will recognize that the steps of delete object function 100 in FIG. 5 may be implemented using standard programming techniques into a set of computer implemented instructions executed by a processor.

In operation of the present invention, a new object may be added to an existing chart by placing the object on a line connecting two objects. The present invention then automatically redraws the line into two lines to indicate the relationship between the new object and the existing objects. Alternatively, when an intermediate object between two existing objects connected by a line is deleted, the lines connecting the two remaining objects are automatically redrawn as a single line between the objects.

The present invention provides several technical advantages including automatically generating the appropriate line or lines whenever an object is inserted in or deleted from an existing graphics chart. The present invention provides for making the appropriate changes to a chart whenever an object is inserted or deleted so that the chart may be updated quickly and efficiently. Additionally, the present invention is part of graphics software application ABC FlowCharter 4.0 from Micrografx Inc., of Richardson, Tex. 75081.

Although the present invention has been described in detail, it should be understood that various changes, substitutions, and alterations can be made hereto without departing from the spirit and scope of the invention as defined by the appended claims.

What is claimed is:

1. A method for inserting an object into a computer-generated graphics chart, the method comprising the steps of:

maintaining a location for each object and line in the graphics chart including a source and destination point for each line; and responding to a command indicating a new object is to be inserted into the chart by;

determining whether the new object is pierced by a line in the chart, each line piercing the new object having an original source point and an original destination point, redefining the line piercing the new object into two lines, including a line entering the new object and a line exiting the new object, defining a destination point for the line entering the new object to a destination point on the new object, defining a source point for the line exiting the new object to a source point on the new object, routing the line entering the new object from the original source point to the destination point on the new object, and routing the line exiting the new object from the source point on the new object to the original destination point.

2. The method of claim 1 further comprising the steps of defining a bounding box around the new object and wherein the determining step further comprises determining whether the bounding box is pierced by a line in the chart.

3. The method of claim 2 further comprising the steps of:

identifying an enter face on the bounding box where the line enters the bounding box;

identifying an exit face on the bounding box where the line exits the bounding box;

defining the destination point for the line entering the new object to a destination point on the enter face of the bounding box; and defining the source point for the line exiting the new object to a source point on the exit face of the bounding box.

4. The method of claim 3 wherein the destination point on the enter face of the bounding box is the center of the enter face, and wherein the source point on the exit face of the bounding box is the center of the exit face.

5. The method of claim 1 wherein the routing the line steps further comprises routing the line entering the new object and the line exiting the new object using the same line attributes as for the line piercing the new object.

6. A method for deleting an object from a computer-generated graphics chart, the method comprising the steps of:

maintaining a location for each object and line in the graphics chart including a source and destination point for each line; and responding to a command indicating an object is to be deleted from the chart by;

determining whether the deleted object has a first line entering said deleted object and a second line exiting said deleted object, the lines entering and exiting the deleted object each having an original source point and an original destination point, removing the deleted shape from the chart, and routing one of the first line and second line from the original source point of the first line to the original destination point of the second line.

7. The method of claim 6 wherein the routing step further comprises:

deleting the first line; and routing the second line from the source point of the first line to the destination point of the second line.

8. The method of claim 6 wherein the routing step further comprises:

deleting the second line; and routing the first line from the source point of the first line to the destination point of the second line.

9. The method of claim 6 wherein the routing step further comprises routing the remaining line using its original line attributes.

10. A method for inserting an object into and deleting an object from a computer-generated graphics chart, the method comprising the steps of:

maintaining a location for each object and line in the graphics chart including a source and destination point for each line;

responding to a command indicating a new object is to be inserted into the chart by;

determining whether the new object is pierced by a line in the chart, each line piercing the new object having an original source point and an original destination point, redefining the line piercing the new object into two lines, including a line entering the new object and a line exiting the new object, defining a destination point for the line entering the new object to a destination point on the new object, defining a source point for the line exiting the new object to a source point on the new object, routing the line entering the new object from the original source point to the destination point on the new object, and routing the line exiting the new object from the source point on the new object to the original destination point; and responding to a command indicating an object is to be deleted from the chart by;

determining whether the deleted object has a first line entering said deleted object and a second line exiting said deleted object, the lines entering and exiting the deleted object each having an original source point and an original destination point, removing the deleted shape from the chart, and routing one of the first line and second line from the original source point of the first line to the original destination point of the second line.

11. The method of claim 10 further comprising the steps of defining a bounding box around the new object and wherein the first determining step further comprises determining whether the bounding box is pierced by a line in the chart.

12. The method of claim 11 further comprising the steps of:

identifying an enter face on the bounding box where the line enters the bounding box;

identifying an exit face on the bounding box where the line exits the bounding box;

defining the destination point for the line entering the new object to a destination point on the enter face of the bounding box; and defining the source point for the line exiting the new object to a source point on the exit face of the bounding box.

13. The method of claim 12 wherein the destination point on the enter face of the bounding box is the center of the enter face, and wherein the source point on the exit face of the bounding box is the center of the exit face.

14. The method of claim 10 wherein the first and second routing the line steps further comprises routing the line entering the new object and the line exiting the new object using the same line attributes as for the line piercing the new object.

15. The method of claim 10 wherein the third routing step further comprises:

deleting the first line; and routing the second line from the source point of the first line to the destination point of the second line.

16. The method of claim 10 wherein the third routing step further comprises:

deleting the second line; and rerouting the first line from the source point of the first line to the destination point of the second line.

17. The method of claim 10 wherein the third routing step further comprises routing the remaining line using its original line attributes.

18. A computer graphics program for inserting an object into and deleting and object from a computer-generated graphics chart, the program comprising:

computer implemented instructions for maintaining a location for each object and line in the graphics chart including a source and destination point for each line;

computer implemented instructions for responding to a command indicating a new object is to be inserted into the chart by;

determining whether the new object is pierced by a line in the chart, each line piercing the new object having an original source point and an original destination point, redefining the line piercing the new object into two lines, including a line entering the new object and a line exiting the new object, defining a destination point for the line entering the new object to a destination point on the new object, defining a source point for the line exiting the new object to a source point on the new object, routing the line entering the new object from the original source point to the destination point on the new object, and routing the line exiting the new object from the source point on the new object to the original destination point; and computer implemented instructions for responding to a command indicating an object is to be deleted from the chart by;

determining whether the deleted object has a first line entering said deleted object and a second line exiting said deleted object, the lines entering and exiting the deleted object each having an original source point and an original destination point, removing the deleted shape from the chart, and routing one of the first line and second line from the original source point of the first line to the original destination point of the second line.

19. The computer program of claim 18 further comprising computer implemented instructions for defining a bounding box around the new object and for determining whether the bounding box is pierced by a line in the chart.

20. The computer program of claim 19 wherein the computer implemented instructions further comprises instructions for:

identifying an enter face on the bounding box where the line enters the bounding box;

identifying an exit face on the bounding box where the line exits the bounding box;

defining the destination point for the line entering the new object to a destination point on the enter face of the bounding box; and defining the source point for the line exiting the new object to a source point on the exit face of the bounding box.

* * * * *